(12) United States Patent
Trentel

(10) Patent No.: US 11,801,127 B2
(45) Date of Patent: Oct. 31, 2023

(54) METHOD AND SYSTEM FOR A MODULAR DENTAL DEVICE

(71) Applicant: Maurice Matthew Trentel, Mableton, GA (US)

(72) Inventor: Maurice Matthew Trentel, Mableton, GA (US)

(73) Assignee: Maurice Matthew Trentel, Mableton, GA (US)

( * ) Notice: Subject to any disclaimer, the term of this patent is extended or adjusted under 35 U.S.C. 154(b) by 339 days.

(21) Appl. No.: 17/223,529

(22) Filed: Apr. 6, 2021

(65) Prior Publication Data

US 2021/0307887 A1 Oct. 7, 2021

Related U.S. Application Data

(60) Provisional application No. 63/006,495, filed on Apr. 7, 2020.

(51) Int. Cl.
| | |
|---|---|
| *A47L 13/22* | (2006.01) |
| *A61C 17/22* | (2006.01) |
| *A46B 5/00* | (2006.01) |
| *A46B 13/04* | (2006.01) |

(52) U.S. Cl.
CPC .......... *A61C 17/227* (2013.01); *A46B 5/0095* (2013.01); *A46B 13/04* (2013.01)

(58) Field of Classification Search
CPC . A61C 17/227; A46B 11/002; A46B 11/0065; A46B 11/08
See application file for complete search history.

(56) References Cited

U.S. PATENT DOCUMENTS

| | | | |
|---|---|---|---|
| 7,621,687 B1 * | 11/2009 | Rehkemper | A61C 17/36 401/270 |
| D864,578 S | 10/2019 | Liu | |
| D864,579 S | 10/2019 | Wainless et al. | |
| D864,584 S | 10/2019 | Frei | |
| D865,367 S | 11/2019 | Courtney | |
| D865,368 S | 11/2019 | Jimenez et al. | |
| D866,164 S | 11/2019 | Chen | |
| D866,188 S | 11/2019 | Wagner et al. | |
| D866,750 S | 11/2019 | Yan et al. | |
| D866,854 S | 11/2019 | Swartz | |
| D866,855 S | 11/2019 | Swartz | |

(Continued)

OTHER PUBLICATIONS

Ge, et al., "The Use of Quaternary Ammonium to Combat Dental Caries", Materials (Basel). Jun. 2015; 8(6): 3532-3549. doi: 10.3390/ma8063532.

*Primary Examiner* — Jennifer C Chiang
(74) *Attorney, Agent, or Firm* — Meunier Carlin & Curfman LLC

(57) ABSTRACT

Exemplary devices and methods facilitate a modular dental device including cartridges. The modular dental device includes an energy storage module, dispensing unit, motor, controller, button, and tube, configured to dispense a compound at a dispensing port. The modular dental device includes a chamber that may receive cartridges containing different compounds, and may serve different functions including cleaning and whitening. The modular dental device may be reconfigured to perform different functions by combining different dental device sections, or by changing the order that different dental device sections are connected in.

34 Claims, 13 Drawing Sheets

(56) References Cited

U.S. PATENT DOCUMENTS

| | | |
|---|---|---|
| D866,980 S | 11/2019 | Manhas |
| D867,579 S | 11/2019 | Porter et al. |
| 10,463,143 B2 | 11/2019 | Harris et al. |
| 10,463,298 B1 | 11/2019 | Myslinski |
| 10,463,450 B2 | 11/2019 | Le Penske |
| 10,463,460 B2 | 11/2019 | Dai et al. |
| 10,463,461 B2 | 11/2019 | Klemm et al. |
| 10,463,462 B2 | 11/2019 | Okai |
| 10,463,463 B2 | 11/2019 | Luo et al. |
| 10,463,464 B2 | 11/2019 | Silverberg |
| 10,466,881 B2 | 11/2019 | Sasaki et al. |
| 10,467,949 B2 | 11/2019 | Han et al. |
| 10,469,599 B2 | 11/2019 | Yoden |
| 10,469,989 B2 | 11/2019 | de Barros Chapiewski et al. |
| 10,469,990 B2 | 11/2019 | de Barros Chapiewski et al. |
| 10,470,558 B2 | 11/2019 | Willi et al. |
| 10,470,618 B2 | 11/2019 | Clos |
| 10,470,620 B2 | 11/2019 | Jun et al. |
| 10,470,857 B2 | 11/2019 | Schaefer et al. |
| 10,470,858 B2 | 11/2019 | Liu |
| 10,470,993 B2 | 11/2019 | Hong et al. |
| 10,471,033 B2 | 11/2019 | Han |
| 10,471,151 B2 | 11/2019 | Lin et al. |
| 10,471,613 B2 | 11/2019 | Nishimura et al. |
| 10,471,698 B2 | 11/2019 | Prasad et al. |
| 10,477,838 B2 | 11/2019 | Dertsakyan |
| 10,477,952 B2 | 11/2019 | Jimenez et al. |
| 10,477,953 B2 | 11/2019 | Flynn |
| 10,477,954 B2 | 11/2019 | Olson |
| 10,477,957 B2 | 11/2019 | Blachford et al. |
| 10,477,958 B2 | 11/2019 | Xi et al. |
| 10,477,959 B2 | 11/2019 | Dengler et al. |
| 10,478,267 B2 | 11/2019 | Guenst et al. |
| 10,478,273 B2 | 11/2019 | Kraft et al. |
| 10,478,274 B2 | 11/2019 | Bloch et al. |
| 10,478,515 B2 | 11/2019 | Shur et al. |
| 10,478,963 B1 | 11/2019 | Workman |
| 10,479,960 B2 | 11/2019 | Mohammadi et al. |
| 10,481,631 B2 | 11/2019 | Battlogg |
| 10,482,488 B2 | 11/2019 | Warner et al. |
| 2017/0116665 A1* | 4/2017 | Alzahrani ............ A46B 5/0025 |
| 2017/0360537 A1* | 12/2017 | Landau .................. A61C 15/00 |

* cited by examiner

METHOD AND SYSTEM FOR A MODULAR DENTAL DEVICE

RELATED APPLICATION

This application claims priority to, and the benefit of, U.S. Provisional Application No. 63/006,495, filed Apr. 7, 2020, entitled "Method and System for Modular Dental Device," which is incorporated by reference herein in its entirety.

BACKGROUND

Dental homecare generally includes a variety of different procedures. Common home health dental procedures include flossing, brushing, rinsing, and whitening. There is a myriad of dental device designs for these procedures. Additionally, separate mouth rinse, wash and whiteners are available to be used in combination with flossing, brushing.

There is a benefit to having additional designs for dental devices that could provide more synergistic functions.

SUMMARY

An exemplary method and system are disclosed that facilitate a modular dental device. The modular dental device is configured to include multiple sections. The multiple sections of the modular dental device may be reconfigured or arranged to serve different functions. Additionally, individual sections of the modular dental device may be configured to contain one or more reagent cartridges and dispense reagents from cartridges.

Modular dental devices can serve as multifunction tools, reducing the total number of dental devices required to provide for a user's oral hygiene needs. Additionally, multifunction devices can be less expensive than the combination of single function devices that a multifunction device can replace. The multifunction device in operating together may also save time for the user. In some embodiments, the present disclosure relates to devices and methods for a modular medical device.

In an aspect, the present disclosure relates to a modular dental device, the device which, in one embodiment, includes: an elongated housing having a length that is approximately that of an electric toothbrush, the elongated housing having a handle end and a head end, the elongated housing forming an open or closed chamber to receive a modular cartridge comprising a dispensable cleaning or whitening compound to be dispensed through and from the dental device, the elongated housing having a compartment to receive an energy storage module (e.g., one or more Li or Ni batteries); an attachable and releasable seal to connect to a port of the modular cartridge; and a dispensing unit comprising a motor, controller, actuate-able button, and tube all located in the elongated housing, the tube seal-ably connecting a pressure-inducing portion of the motor to the attachable seal to draw, when the motor is actuated by the controller, the dispensable cleaning or whitening compound from the modular cartridge to dispense at a dispensing port located at the head end.

In one embodiment, the head end of the modular dental device includes bristles that define a brush region, the dispensing port being located proximal to the brush region.

In one embodiment, the head end includes a connector to attachably and releasably connect to a head portion, wherein the head portion comprises bristles that define a brush region.

In one embodiment, the head end includes a connector to attachably and releasably connect to a modular head portion, including a first modular head portion and a second modular head portion.

In one embodiment, the first modular head portion includes bristles that defines a brush region.

In one embodiment, the second modular head portion comprises a fluid dispensing head.

In one embodiment, the dispensing unit further includes one or more thermal adjusting components (e.g., to heat, to cool, or to heat and cool), the one or more thermal adjusting components being configured to change a temperature of tube or tube-associated region when actuated.

In one embodiment the modular dental device is modularly configured to perform any of the method discussed below.

In one embodiment the elongated housing of the modular dental device includes a first modular dental device section and a second modular dental device section; where the dispensing unit is formed in the first modular dental device section of the elongated housing, and the open or closed chamber is formed in the second modular dental device section; and where the dispensing unit includes a funnel-shaped interconnect with a narrow funnel end positioned in the direction of fluid flow and an open funnel end opposite the narrow funnel end, where the first modular dental device section is defined by a first end and a second end, where the first end includes a head end, and the head end includes a connector to attachably and releasably connect to a modular head portion, and where the second end of the first modular dental device section includes a first interconnect configured to releasably attach and detach from a corresponding interconnect; where the second modular dental device section is defined by a third end and a fourth end, where the second modular dental device section includes, at the third end, the corresponding interconnect and a fluidic interface, where the fluidic interface is coupled to a fluidic interconnect that is connected to the chamber located in the second modular dental device section; and where at the fourth end, the second modular dental device section includes a modular base section that is attachably and releasably connected to the fourth end of the second modular dental device section, where the modular base section includes a push button.

In another aspect, the present disclosure relates to a cartridge for a modular dental device which, in one embodiment includes: a dispensable cleaning or whitening compound; and a housing that defines a chamber to store the dispensable cleaning or whitening compound, the housing defining a port in the chamber to which the dispensable cleaning or whitening compound can be drawn, wherein the cartridge is configured to operate with any of the modular dental device discussed above.

In another aspect, the present disclosure relates to method of operating a modular dental device. In one embodiment, the method includes: providing a plurality of modular dental device section, including a first modular dental device section, a second modular dental device section, and a third modular dental device section, wherein the first dental device section is defined by a first end and a second end, wherein the first end includes at least one of a brush section and a dispensing section, and wherein the second end includes a first interconnect configured to releasably attach and detach from a corresponding interconnect; wherein the second modular dental device section is defined by a third end and a fourth end, wherein the second modular dental device section includes, at the third end, the corresponding interconnect and an fluidic interface, wherein the fluidic interface is coupled to a fluidic interconnect that is connected to a chamber located in the second modular dental device section; wherein the third modular dental device section is defined by a fifth end and a sixth end, wherein the third modular dental device section includes, at the fifth end, the corresponding interconnect and a mechanical link, wherein the mechanical link is coupled to a motor located in the third modular dental device section; attaching, via the interconnect and the corresponding interconnect, the second end of the first device section to the first end of the second device section to form a first single unitary structure in a first configuration of the modular dental device; detaching the second end of the first device section from the first end of the second device section; attaching, via the interconnect and the corresponding interconnect, the second end of the first device section to the fifth end of the third device section to form a second single unitary structure, wherein the attachment between the first dental device section and the third dental device section form a second configuration of the modular dental device.

In some embodiment, the first single unitary structure of the first configuration of the modular dental device has a length that is approximately that of an electric toothbrush, and wherein the second single unitary structure of the second configuration of the modular dental device also has a length that is approximately that of an electric toothbrush.

In some embodiment, a fourth modular dental device section is provided, and wherein the fourth modular dental device section attaches and detaches to the second module to provide a third configuration, wherein the fourth module includes a motor and an AC/converter, energy storage, chargers (e.g., Battery, Solar Panel)).

In some embodiment, the fourth modular dental device section is configured to attach and detach from the third modular dental device section to provide a fourth configuration, wherein the fourth module includes the AC/converter, energy storage, chargers (e.g., Battery, Solar Panel)).

In some embodiment, the first configuration of the modular dental device is about the length of an electric toothbrush.

In some embodiment, the fluidic interconnect is configured to heat the fluidic interface.

In some embodiment, the fluidic interconnect is configured to cool the fluidic interface with a heat exchanger.

In some embodiment, the heat exchanger is located at the chamber.

In some embodiment, the chamber is configured to receive a container or capsule of corresponding shape and size.

In some embodiment, the container or capsule is configured to hold a powder, a gel, or a fluid.

In some embodiment, the fluidic interconnect includes a pump.

In some embodiment, the powder, gel or fluid is extruded from the chamber via the pump.

In some embodiment, the brush section is modular and can be attached to a pick section.

In another aspect, the present disclosure relates to a method of operating a modular medical device, which, in some embodiments, includes: providing a plurality of modular medical device section, including a first modular medical device section, a second modular medical device section, and a third modular medical device section, wherein the first medical device section is defined by a first end and a second end, wherein the first end includes at least one of a brush section and a dispensing section, and wherein the second end includes a first interconnect configured to releasably attach and detach from a corresponding interconnect; wherein the second modular medical device section is defined by a third end and a fourth end, wherein the second modular medical device section includes, at the third end, the corresponding interconnect and an fluidic interface, wherein the fluidic interface is coupled to a fluidic interconnect that is connected to a chamber located in the second modular medical device section; wherein the third modular medical device section is defined by a fifth end and a sixth end, wherein the third modular medical device section includes, at the fifth end, the corresponding interconnect and a mechanical link, wherein the mechanical link is coupled to a motor located in the third modular medical device section; attaching, via the interconnect and the corresponding interconnect, the second end of the first device section to the first end of the second device section to form a first single unitary structure in a first configuration of the modular medical device; detaching the second end of the first device section from the first end of the second device section; attaching, via the interconnect and the corresponding interconnect, the second end of the first medical device section to the fifth end of the third medical device section to form a second single unitary structure, wherein the attachment between the first medical device section and the third medical device section form a second configuration of the modular medical device.

In some embodiment, the first single unitary structure of the first configuration of the modular medical device has a length that is approximately that of an electric toothbrush, and wherein the second single unitary structure of the second configuration of the modular dental device also has a length that is approximately that of an electric toothbrush.

In some embodiment, a fourth modular medical device section is provided, and wherein the fourth modular dental device section attaches and detaches to the second module to provide a third configuration, wherein the fourth module includes a motor and a AC/converter, energy storage, chargers (e.g., Battery, Solar Panel)).

In some embodiment, the fourth modular medical device section is configured to attach and detach from the third modular medical device section to provide a fourth configuration, wherein the fourth module includes the AC/converter, energy storage, chargers (e.g., Battery, Solar Panel)).

In some embodiment, the first configuration of the modular medical device is about the length of an electric toothbrush.

In some embodiment, the fluidic interconnect is configured to heat the fluidic interface.

In some embodiment, the fluidic interconnect is configured to cool the fluidic interface with a heat exchanger.

In some embodiment, the heat exchanger is located at the chamber.

In some embodiment, the chamber is configured to receive a container or capsule of corresponding shape and size.

In some embodiment, the container or capsule is configured to hold a powder, a gel, or a fluid.

In some embodiment, the fluidic interconnect includes a pump.

In some embodiment, the powder, gel or fluid is extruded from the chamber via the pump.

In some embodiment, the brush section is modular and can be attached to a pick section.

Other aspects and features according to the example embodiments of the disclosed technology will become apparent to those of ordinary skill in the art, upon reviewing the following detailed description in conjunction with the accompanying figures.

BRIEF DESCRIPTION OF THE DRAWINGS

The accompanying drawings, which are incorporated in and constitute a part of this specification, illustrate embodiments and together with the description, serve to explain the principles of the devices and methods.

DETAILED DESCRIPTION

Figure 1:
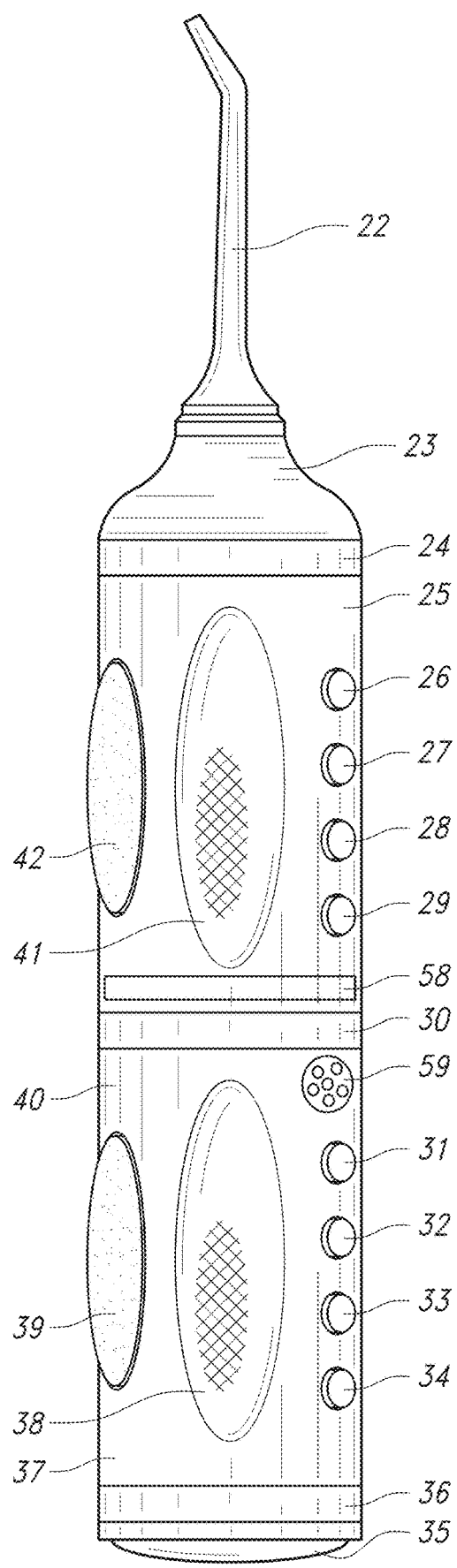
FIG. 1 shows a modular dental device in accordance with an illustrative embodiment.

Although example embodiments of the disclosed technology are explained in detail herein, it is to be understood that other embodiments are contemplated. Accordingly, it is not intended that the disclosed technology be limited in its scope to the details of construction and arrangement of components set forth in the following description or illustrated in the drawings. The disclosed technology is capable of other embodiments and of being practiced or carried out in various ways.

It must also be noted that, as used in the specification and the appended claims, the singular forms "a," "an" and "the" include plural referents unless the context clearly dictates otherwise. Ranges may be expressed herein as from "about" or "approximately" one particular value and/or to "about" or "approximately" another particular value. When such a range is expressed, other exemplary embodiments include from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the disclosed technology. Similarly, it is also to be understood that the mention of one or more components in a device or system does not preclude the presence of additional components or intervening components between those components expressly identified.

In the following description, references are made to the accompanying drawings that form a part hereof and that show, by way of illustration, specific embodiments or examples. In referring to the drawings, like numerals represent like elements throughout the several figures. Throughout the disclosure, the terms "connector" and "interconnect" may be used interchangeably to refer to any suitable attachment component or components, including but not limited to latches and spindles. The modular dental device referred to throughout the present disclosure can also be configured as a modular medical device.

Example System

FIG. 1 depicts an exemplary modular dental device in accordance with an illustrative embodiment. As shown in FIG. 1, the modular dental device includes an elongated housing approximately about the length of an electric toothbrush (e.g., between 6 and 8 inches). The elongated housing includes a first section 25, a second section 40, and a dispensing chamber 23 that are connected by interconnects 24, 30. One end of the housing includes a handle, and the other end of the housing includes a head 22. The handle may include one or more grip pads 38, 41. The housing includes a dispensing chamber 23 that is joined to one section using an interconnect 24 that is configured to allow material to flow from the housing to the dispensing chamber 23.

Referring still to FIG. 1, in some embodiments, the elongated housing also may contain a compartment including a battery or other energy source, for example, lithium-ion batteries, nickel metal hydride-based batteries, or the like, as well as non-rechargeable batteries. The battery can be charged by attaching a power cord to an attachment point 37 located on the elongated housing. A user can operate the device using controls located on the elongated housing. In some embodiments, the battery is connected to a solar power source/inverter, or other charging or electricity conversion systems.

The controls may include buttons 26, 27, 28, 29, 31, 32, 33, 34 located on the surface of the elongated housing, rubber covered push buttons 39 or other input devices. The buttons 26, 27, 28, 29, 31, 32, 33, 34 can activate different features of the modular dental device. Buttons 26, 31, e.g., can activate/deactivate a temperature control or thermostat configured to heat/cool the dispensing chamber 23 and/or or head 22. Buttons 27, 32 can initiate the transmission of material (i.e., a reagent) from the dispensing chamber 23 to the head 22. Buttons 28, 33 can activate a Wi-Fi/Internet application or connectivity. The Internet application can include administrator controls and an "admin control panel" interface, that can be displayed on the display 58. Buttons 29, 34 can control a mix/separate function for mixing and/or separating materials in the device sections 25, 40 or dispensing chamber 23.

The functions, order, and arrangement of buttons in FIG. 1 are intended only as non-limiting examples, and other functions, orders, and arrangements of buttons are contemplated by the present disclosure.

Figure 2:
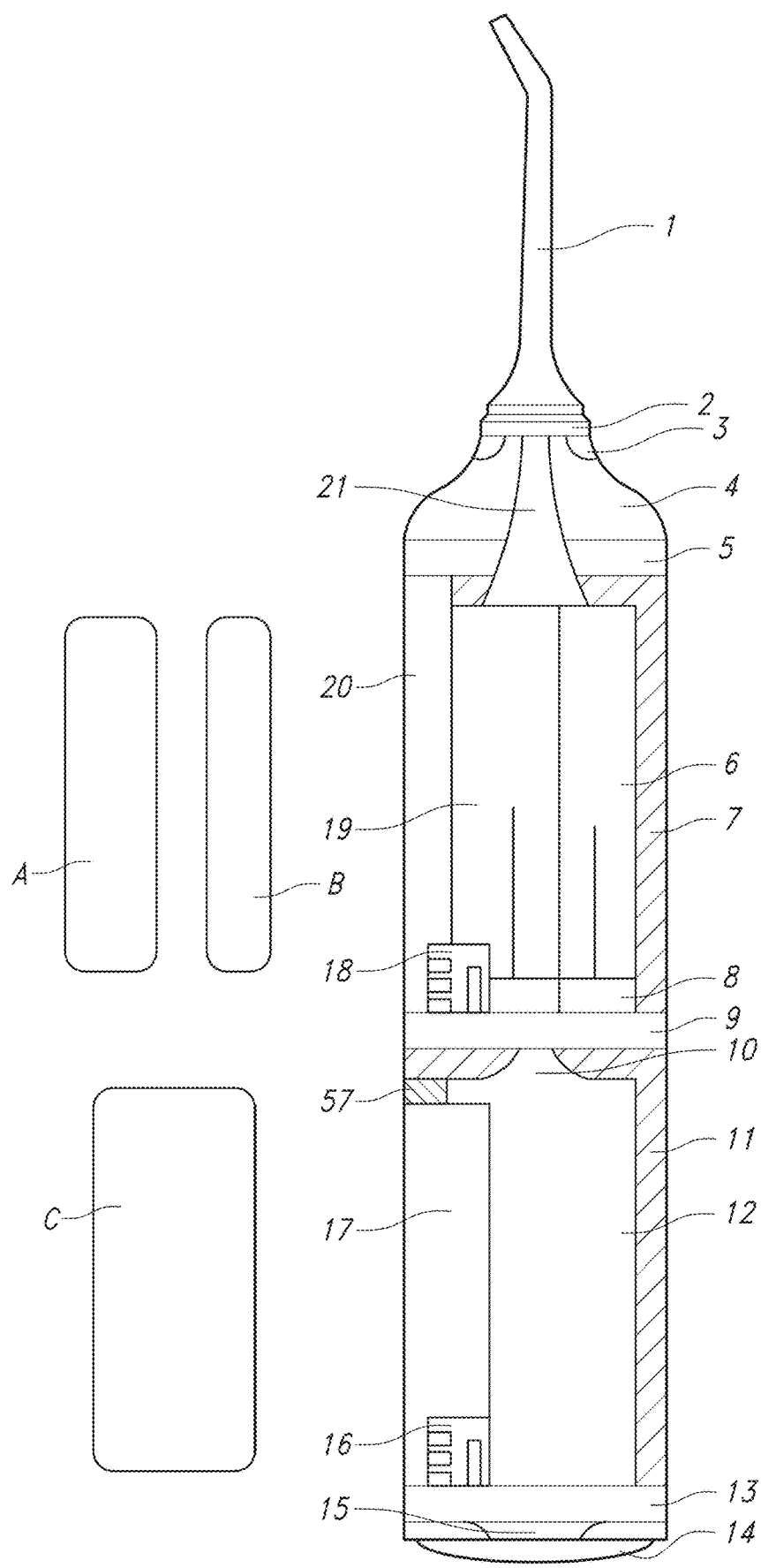
FIG. 2 shows a cutaway view of a modular dental device in accordance with an illustrative embodiment.

The housing may contain one or more chambers configured to receive a modular cartridge (not shown—see FIG. 2). The modular cartridge contains a compound that is configured to be dispensed through and from the dental device. The chamber and cartridge are configured so that a port on the cartridge and a seal within the chamber can connect to form a fluid passage. This connection between the chamber and cartridge is attachable and releasable and allows for the cartridge to be freely attached and released from the chamber as needed. The port within the chamber is attached to a tube, and a motor within the elongated housing is configured to induce a pressure within the tube to draw the compound out of the cartridge, through the seal, into the tube, and into the head 22 where it can be dispensed. In some embodiments, the motor (not shown) may operate a pump (not shown) to create pressure that draws the compound out of the cartridge and to the dispensing head 22.

In some embodiments, the elongated housing may be configured to receive multiple cartridges. The elongated housing may be configured with multiple chambers, and each chamber may contain multiple seals. Additional tubes may be included to direct the flow of the of compounds. The tubes and motor may be configured so that the compounds are mixed before they are dispensed from the modular dental device. Additionally, the compounds may can dispensed in sequence. For example, a toothpaste solution may be dispensed before or after a mouthwash solution, or two whitening compounds may be mixed together before they are dispensed. Additionally, compounds may be dispensed at the same time, without mixing (e.g., two types of rinse). Different combinations of dispensing sequences may be used alternatively, or combined. The user may directly control some, or all of one or more dispensing actions using one or more of the buttons 26, 27, 28, 29, 31, 32, 33, 34. One or more controllers may be positioned within the housing. The controller may include memory, processors, and inputs/outputs configured to control the device in response to user input. The controller may also perform some or all of the dispensing actions automatically, either based on instructions stored in memory or in response to inputs into the controller. In some embodiments, these inputs may include audio or video inputs. Video input and/or output may be accomplished with a video monitor display 58, and audio input/output may be performed using an audio device 59.

Non-limiting examples of compounds that may be dispensed include cleaning compounds and whitening compounds. The motor may be controlled by a controller unit that is also located within the elongated housing. The controller may activate the motor in response to user input through one or more of the buttons 26, 27, 28, 29, 31, 32, 33, 34 located on the elongated housing, or through a fabric or cloth covered push-button 35, or other input method. In some embodiments, the controller is configured to receive instructions (e.g., via Bluetooth) from a remote-control unit located outside the elongated housing. Additionally, one or more sections may include a section base ring 36. The section base ring 36 connects the push button 35 to the second section 40. The section base ring 36 can be configured to allow components other than the push button 35 to connect to the second section 40.

In some embodiments, the elongated housing includes at least two sections. At least one end of each section includes an interconnect 24, 30. The interconnects can attach one section to another section and may also allow for the sections to be repeatedly attached and detached from one another. The sections may also include a fluidic interface and fluidic interconnect. The fluidic interface and fluidic interconnects may be configured to allow a compound to flow from one section to another section. For example, a compound may flow from a cartridge located in one section, through a tube located in that section, and through a fluid interconnect to reach a tube in the other section. Different configurations of tubes and interconnects are possible to mix compounds located in one cartridge with those in another cartridge, or to move compounds from one section of the device to another section of the device.

Different components may be located in each section, and different sections may be replaced or combined to form configurations with different functions. For example, in some embodiments, a first section may contain a heater and a chamber, and a second section may contain a cooler and a chamber. A third section contains a motor and a section adapted to receive a head. To configure the device to dispense a heated compound, the user can attach the first section to the third section. To reconfigure the device to dispense a cooled compound, the user can detach the first section from the third section, and then attach the second section to the third section. Other configurations of modular device are contemplated, and different configurations may be desirable depending on what components are located in each modular device section.

Different components may be located in different sections. For example, the motor, the chamber, and the heater may be located in the same section in some embodiments, while in other embodiments the motor, the chamber, and the heater may all be in different sections. Further, in some embodiments, each section may contain a motor, heater, cooler, tubing, chamber, cartridge, controls, controller and head. Different numbers of sections are also possible in different embodiments. The modular dental device may contain one section, two sections, three sections, or more sections as needed to perform the desired range of dental procedures.

In some embodiments, the second section 40 has the same length as the third section. In some embodiments, the second section 40 has a shorter length than the third section, e.g., where the third section is used predominantly as the hand grip.

In some embodiments, the different second sections 40 may have different lengths. A first type of the second section may have shorten length as compared to a second style of the second section 40 (e.g., where the second style is used a body for a hand grip and the first stye is used to housed functional component such as motors, pumps, batteries).

Different configurations of heads 22 are possible. For example, the head 22 may include bristles and act as a brush. The head may also include a dispensing port located near the brush section. In some embodiments, the elongated housing may be configured to allow for different heads 22 to be attached and detached from the elongated housing. For example, the elongated housing may be configured to interchangeably attach to a fluid dispensing head or a head with bristles or another configuration of head.

In some embodiments, the elongated housing also includes a component or components configured to heat, cool, or heat and cool the compound. The compound may be heated or cooled in the cartridge, in the tube, or in any other suitable position. The compound can be a gel, liquid, powder, or any other composition that is suitable for dispensing. Certain compounds may change state when they are heated or cooled. For example, a cartridge may contain a powdered compound that changes to another state (e.g., a gel or liquid) when heated. Therefore, the heating or cooling components may allow for additional types of compounds to be pumped/dispensed from the device.

With reference to FIG. 2, a cutaway view of an embodiment of a modular dental device with two modular device sections is shown. The head 1 is detachably connected to the dispensing chamber 2, 4. This connection 3 may be accomplished by adhesion or another fitting that secures the head to the dispensing chamber 2, 4. The dispensing chamber 4 may include a funnel 21 or other structure configured to direct the flow of material from the dispensing chamber 2, 4 to the head 1. The dispensing chamber 2, 4 is connected to one of the modular dental device sections by a connector 5 that is attachable and detachable. This connector 5 may be a latch, spindle, or other connector that allows for the head 1 to be repeatedly connected and disconnected from the dispensing unit 2, 4. Similarly, the two sections 20, 40 are joined together by a connector 9 that allows for the sections to be reversibly attached and detached from one another. Both the connector 5 between the dispensing chamber 2, 4 and the connector 9 between the device sections may be configured to allow the flow of energy, information, or material between the dispensing chamber 2, 4 and the sections, or between the two sections. The connector 9 may be configured to attach to or include a funnel interconnector 10. A third connector or interconnect 13 is located on one section of the device, and serves to connect a button actuator 15 and padded button 14 to the device. The head 1 may also be modular and may be configured to connect to a pick section.

One or more sections can also include a controller 16, 18. The controller 16, 18 may include inputs, outputs, memory, and a processor. One or more of the buttons 14, GPS Unit/Bluetooth device 57, heating or cooling units 7, 11 or other components may be operably connected to the controller 16, 18 (e.g., to provide information to the controller or receiving inputs from the controller). One or more sections can also include a battery 17 configured to power the controller(s) 16, 18 and/or other components. As discussed herein, the batteries may be coupled to a charging system (e.g., solar or AC/DC converters).

The sections can include a chamber configured to contain an interchangeable capsule or cartridge "A" "B" "C" containing one or more compounds. The interchangeable capsules or cartridges "A" "B" "C" shown in FIG. 2 can be inserted into the chambers 6 12 19 and partially or completely enclosed by the chambers 6, 12, 19. The interchangeable capsules or cartridges can be made out of biodegradable material. Different embodiments may have different numbers of chambers in each section, and some embodiments may not have a chamber in one or both sections. In the embodiment shown in FIG. 2, a first chamber 6 and second chamber 19 are located in one section, a third chamber 12 is located in the other section. The first chamber 6 includes a base 8. Heating and cooling units may be positioned in one or more sections. These heating and cooling units may be configured to heat or cool the interchangeable capsules or cartridges (e.g., "A", "B", or "C" shown in FIG. 2), or the compounds after the compounds are removed from the interchangeable capsules or cartridges (e.g., "A", "B", or "C" shown in FIG. 2). In the embodiment shown in FIG. 2, a first heating or cooling unit 7 is positioned near the first chamber 6. A second heating and cooling unit is located near the different chamber 12. The heating and cooling units may be configured to heat, cool, or both.

Embodiments of the modular dental device shown in FIGS. 1 and 2 may be reconfigured by detaching at least one of the dental device sections from another of the dental device sections and reattaching the removed dental device section to a different dental device section, or to a different part of the same previously-connected dental device section.

Shown below in Table 1 are non-limiting examples of different modular dental device combinations. The column labeled "Head" refers to the head end of the modular dental device. The columns labeled "Section 1" and "Section 2" refer to modular dental device sections in which the Section 1 can attaches to the Head and Section 2 can attached to Section 1 and, in some embodiments, also to the Head. Also included in Table 1 are non-limiting example uses of how the three sections can be used. It should be understood that the below combinations are only examples, and that different Sections from different rows of Table 1 can be combined to create other modular dental devices. For example, an embodiment of the present disclosure can include an angular head (for cleaning) but also contain a motor and controller (e.g., to vibrate or spin the angular head).

TABLE 1

Dental Devices

| Usage | Head | Section 1 | Section 2 |
|---|---|---|---|
| Cleaning | Pick Head (e.g., J Shaped Pick) | Body (Hand Grip) | Body (Hand Grip) |
| Cleaning | Ammonium Salt Chloral-Brush | Body (Natural Fiber Stick Body) | Body (Hand Grip) |
| Cleaning | Wedge Head | Body (Hand Grip) | Body (Hand Grip) |

TABLE 1-continued

Dental Devices

| Usage | Head | Section 1 | Section 2 |
|---|---|---|---|
| Cleaning | Angular (e.g., 45 Degree) Head | Body (Hand Grip) | Body (Hand Grip) |
| Cleaning | Oscillating Head | Controller, Motor | Body (AC/converter, energy storage, chargers (e.g., Battery, Solar Panel)) |
| Cleaning | Pick Head (e.g., J Shaped Pick), ammonium Salt Chloral-Brush Wedge Head; angular (e.g., 45 Degree) head, oscillating Head, floss head, etc. | Body (Hand grip) | |
| Cleaning | Pick Head (e.g., J Shaped Pick), ammonium Salt Chloral-Brush Wedge Head; angular (e.g., 45 Degree) head, oscillating Head, floss head, drill head, etc. | Controller, Motor, battery/charger (Hand grip) | N/A (extenders or cap) |
| Cleaning | Pick Head (e.g., J Shaped Pick), ammonium Salt Chloral-Brush Wedge Head; angular (e.g., 45 Degree) head, oscillating Head, floss head, drill head, spout head, etc. | Controller, dispensing system (e.g., fluid pump), Cartridge (Hand grip) | N/A (extenders or cap) |
| Cleaning | Pick Head (e.g., J Shaped Pick), ammonium Salt Chloral-Brush Wedge Head; angular (e.g., 45 Degree) head, floss head, flashlight head, etc. | Controller, battery or charger (Hand grip) | N/A (extenders or cap) |
| Cleaning | Pick Head (e.g., J Shaped Pick), ammonium Salt Chloral-Brush Wedge Head; angular (e.g., 45 Degree) head, oscillating head, floss head, drill head, spout head, etc. | Controller, dispensing system (e.g., fluid pump), Cartridge (Hand grip) | N/A (extenders or cap) |
| Flossing | Floss Head | Floss Container/Cartridge | Body (Hand Grip) |
| Drilling | Drill Head | Controller, Motor | Body (Battery, Solar Panel) |
| Rinsing | Spout Head | Fluid container (e.g., cartridges, containers, chambers), Fluid pump, Controller | Body (Battery, Solar Panel) |
| Cleaning | Flash Light Head (red, blue, or white) | Controller, Motor | Body (Battery, Solar Panel) |

It should also be understood that the devices shown in Table 1 above can be connected with the attachable/releaseable interconnects 24 30 shown in FIG. 1. As another non-limiting example, the same "Section 2" including a "Body (Hand Grip)" could be used in several different modular dental devices. For example, the same Body (Hand Grip) could be used both as part of a cleaning tool with angular head, and as part of a cleaning tool with a flossing head and floss dispenser. Therefore, a user with one or two "Body (Hand Grip)" modular dental device sections can perform a wide range of functions by changing which "Head" and "Section 1" are connected using the attachable/releasable interconnects 24, 30. The term "extenders" generally refers to a passive component that serves to elongate the overlap system, e.g., to make it comparable in length to a conventional toothbrush and the like.

For example, one of the combinations of the sections in Table 1 includes a spout head (in the Head section); fluid cartridges/containers/chambers, a fluid pump, and a controller (in section 1); and a body with batteries and solar panels (in section 2). This embodiment can be used for cleaning (e.g., by dispensing cleaning/whitening compounds from the head 1 shown in FIG. 1). An embodiment with similar modules is shown in FIGS. 1 and 2 of the present disclosure.

Figure 3:
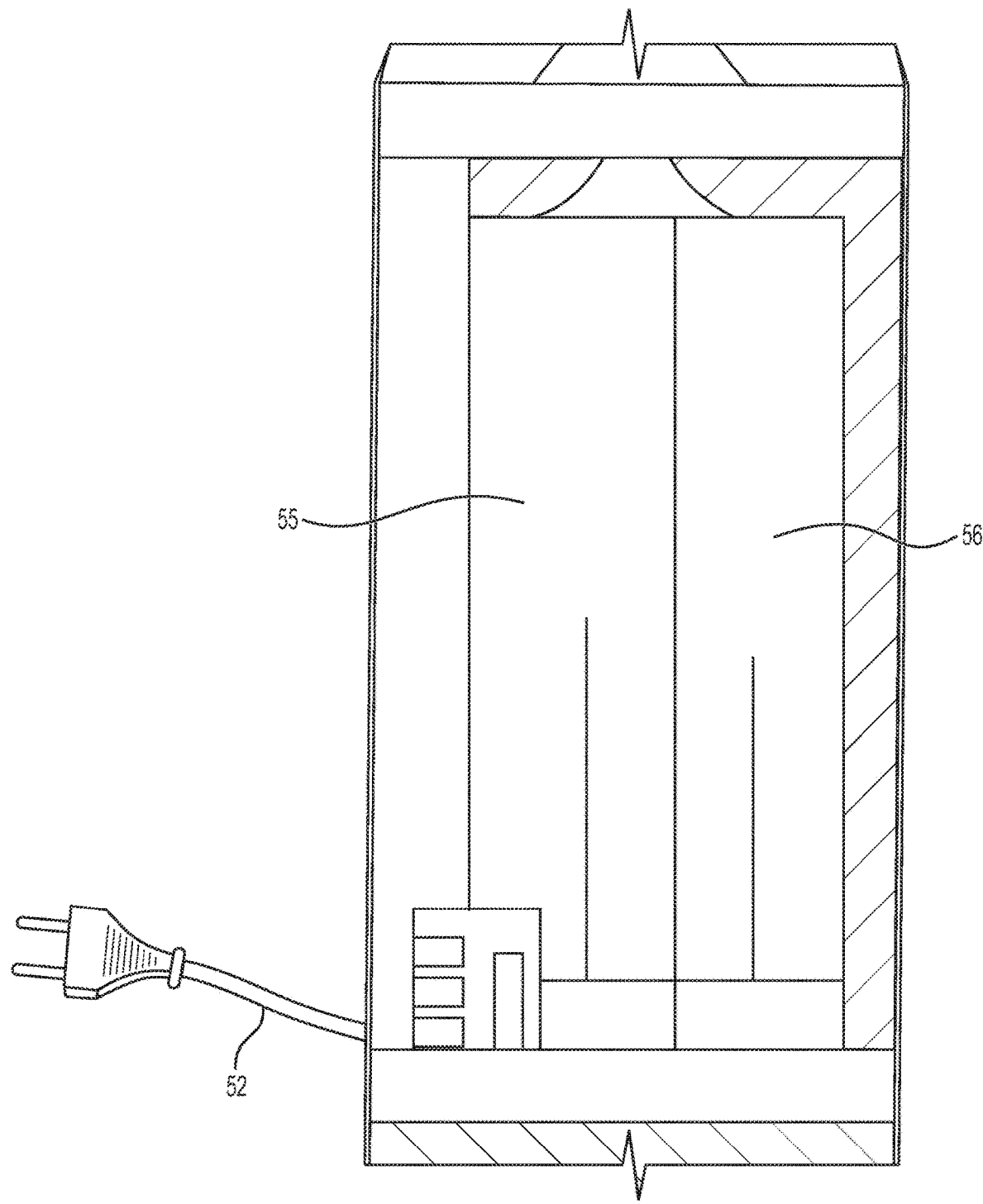
FIG. 3 shows a cutaway view of on section of a modular dental device in accordance with an illustrative embodiment.

FIG. 3 depicts an embodiment of one section of an embodiment of the present disclosure. A power cord 52 is connected to the section, and the power cord 52 may be configured to attach/detach from the section. The section is shown with two chambers 55, 56 for cartridges.

Figure 4:
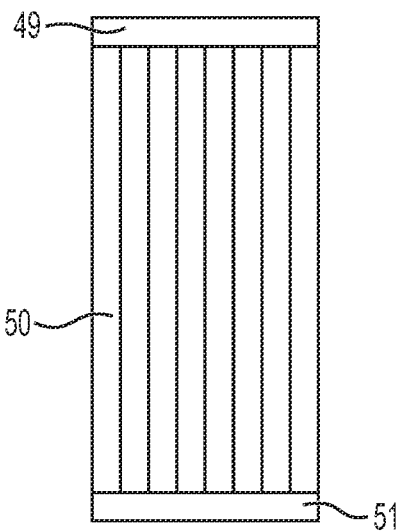
FIG. 4 shows a sectional view of a solar panel recharging unit in accordance with an illustrative embodiment.
Figure 5:
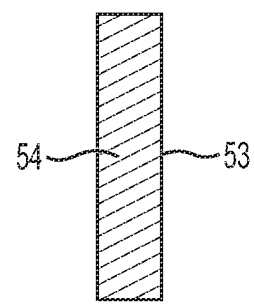
FIG. 5 shows a container or capsule cartridge in accordance with an illustrative embodiment.
Figure 6:
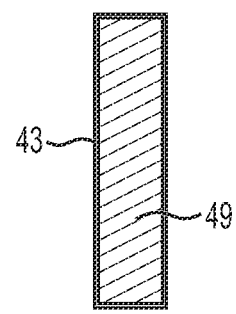
FIG. 6 shows a container or capsule cartridge in accordance with an illustrative embodiment.
Figure 7:
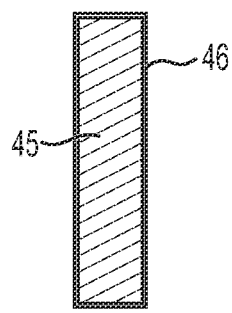
FIG. 7 shows a container or capsule cartridge in accordance with an illustrative embodiment.
Figure 8:
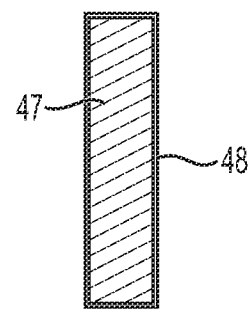
FIG. 8 shows a container or capsule cartridge in accordance with an illustrative embodiment.

FIG. 4 depicts a solar panel 50 with two interconnects 49, 51. The interconnects 49 51 may be configured to attach/detach the solar panel 50 from sections of the modular device, such as the sections depicted in FIGS. 1-3.

FIGS. 5-8 depict cartridges in accordance with embodiments of the present disclosure. Each cartridge contains a casing 53, 43, 46, 48, and can contain a material (e.g., cleaning/whitening compounds 54, mouthwash solution 49, toothpaste solution 45, cleaning compounds 47) used by the device described in FIGS. 1-3.

Figure 9:
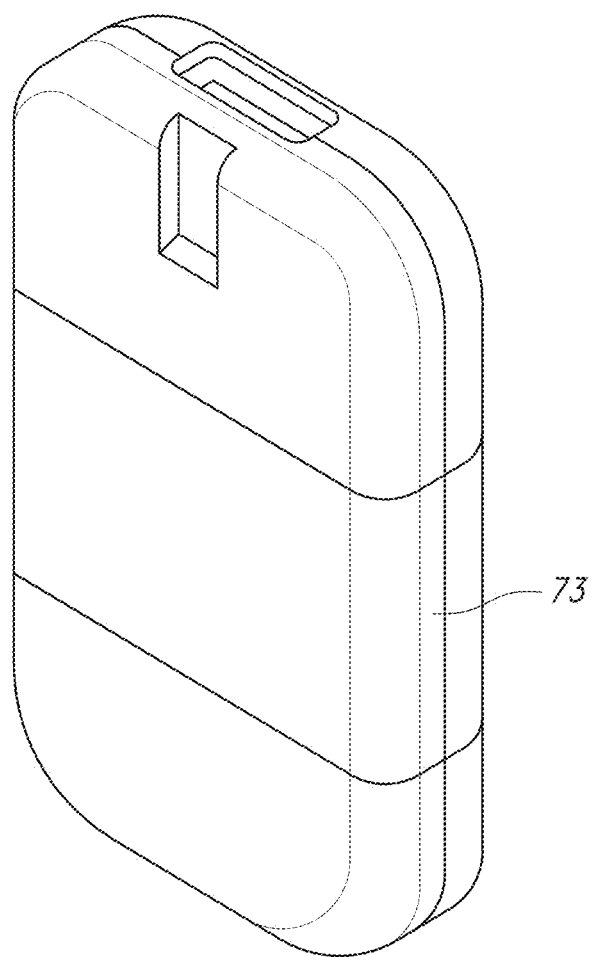
FIG. 9 shows a perspective view of a container or capsule cartridge in accordance with an illustrative embodiment.
Figure 10:
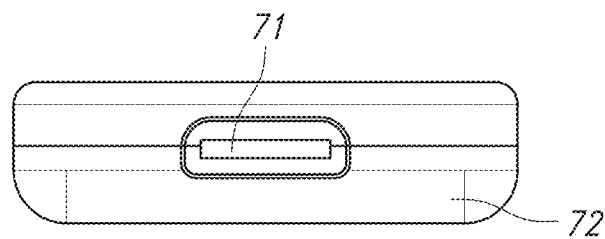
FIG. 10 shows a top view of a container or capsule cartridge in accordance with an illustrative embodiment.

FIG. 9 depicts a removable cartridge container or capsule 73 in accordance with embodiments of the present disclosure. FIG. 10 depicts a bottom view of a cartridge container or capsule 72 and includes an interconnect 71 configured to dispense the contents of the cartridge.

Figure 11:
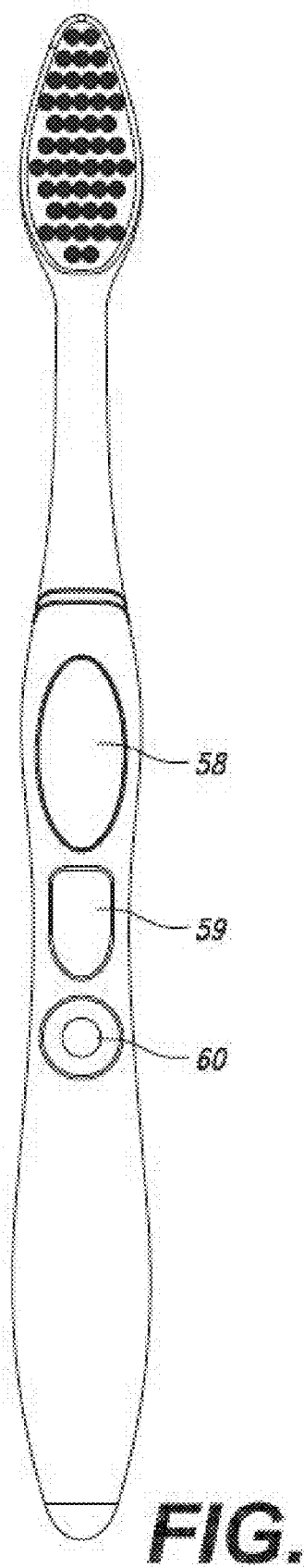
FIG. 11 shows a front view of a non-configurable electric toothbrush with insertable cartridge, manual pump button, and cartridge cover in accordance with an illustrative embodiment.
Figure 12:
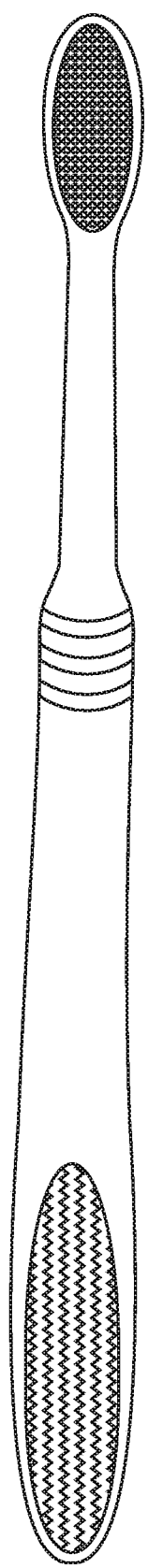
FIG. 12 shows a rear view of a non-configurable electric toothbrush with insertable cartridge, manual pump button, and cartridge cover in accordance with an illustrative embodiment.
Figure 13:
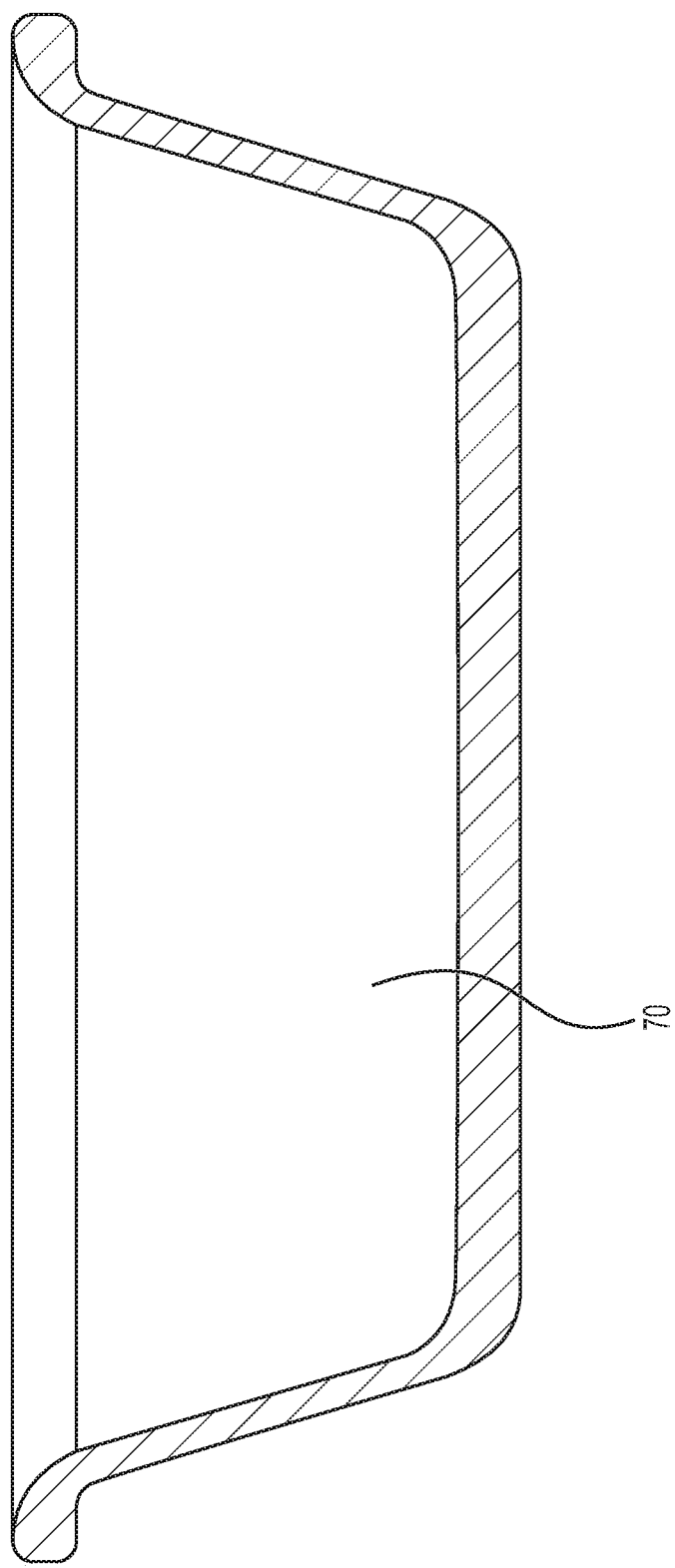
FIG. 13 shows a container or capsule cartridge design in accordance with an illustrative embodiment.

FIGS. 11 and 12 depict front and rear views of an embodiment of the present disclosure without modular sections. A button 58 may be used to turn the device on and off, and a cartridge (not shown) may be inserted into the device. The cartridge may be secured by or covered by a cartridge cover plate 59. A manual pump button 60 can be operated to dispense the cartridge contents from the cartridge. The manual pump button may work in addition to a motor, or as a replacement for a motor. FIG. 13 depicts an embodiment of a cartridge or removable cartridge container or capsule 70 intended for use with the embodiment depicted in FIGS. 11 and 12.

Figure 14:
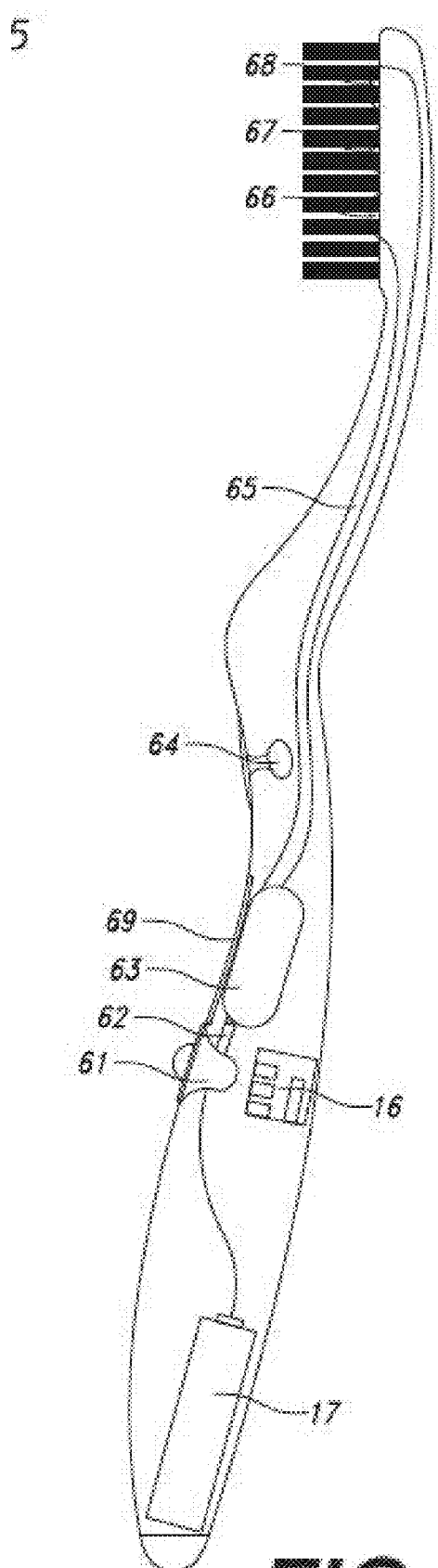
FIG. 14 shows a side view of a non-configurable contemporary electric toothbrush in accordance with an illustrative embodiment.

FIG. 14 depicts a side view of an embodiment of the present disclosure. A manual pump button 61 drives a pressure rod 62 which moves fluid from the cartridge 63 throughout the toothbrush body via a funnel line or tube 65. A cartridge cover plate 69 can cover the cartridge 63. The tube 65 directs the fluid from the cartridge 63 to holes 66, 67, 68 in the toothbrush head where the fluid is dispensed. In some embodiments of the present disclosure, the toothbrush head is configured to emit light (e.g., red or blue light) from the side of the toothbrush head opposite the holes 66, 67, 68. The body may also include a powered cleaning device, such as a device to move the head for mechanical cleaning. According to some embodiments of the present disclosure, the dental device can include a controller 16. The controller 16 may include inputs, outputs, memory, and a processor. In some embodiments of the present disclosure, the controller 16 can also include a communications module (not shown).

Figure 15:
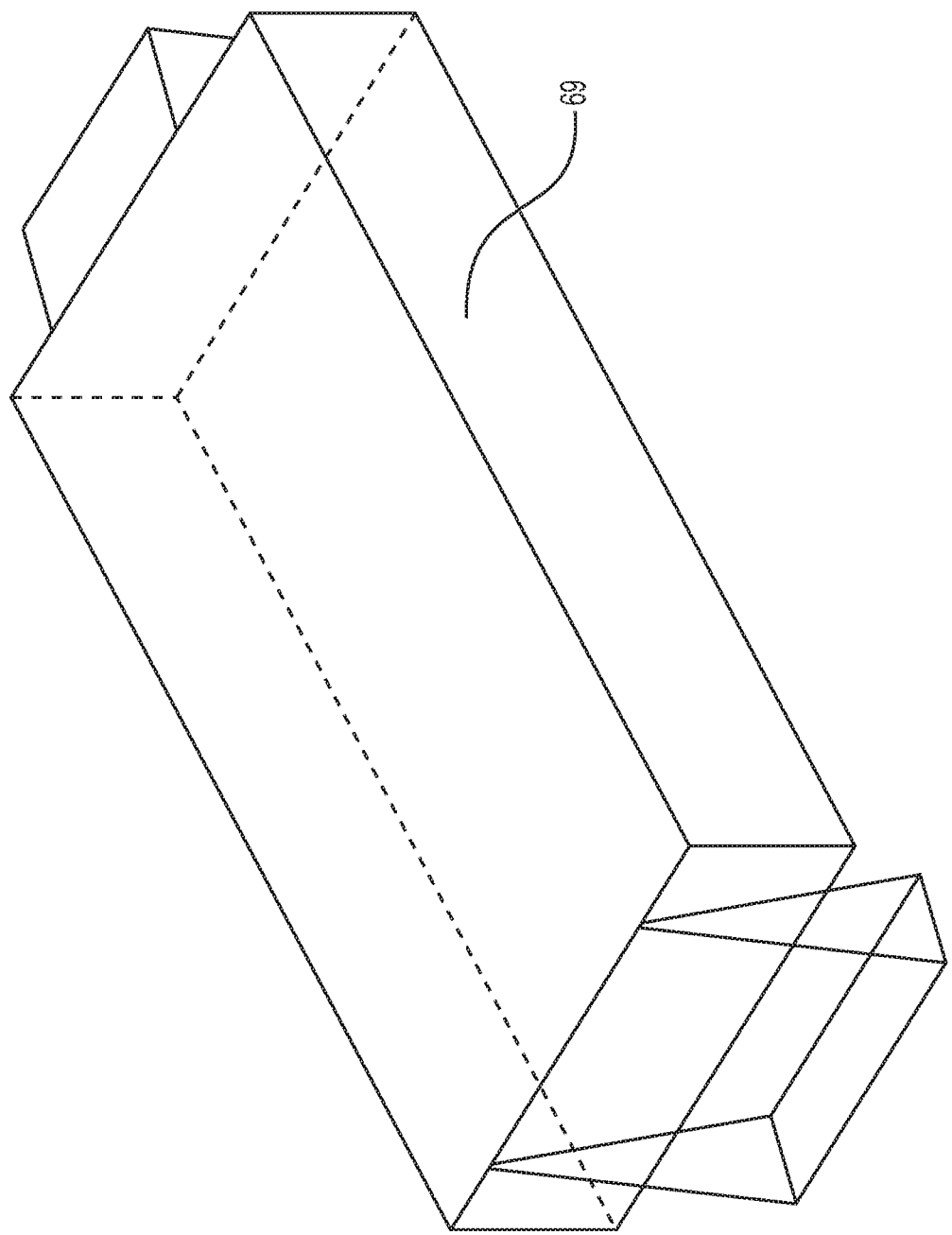
FIG. 15 shows a cartridge plate cover in accordance with an illustrative embodiment.

Non-limiting examples of suitable communications modules include those implementing Bluetooth, Zigbee, or Wi-Fi. One or more buttons 64, pressure rods 62 can be operably connected to the controller 16 (e.g., to provide information to the controller or receiving inputs from the controller). The communications module of the controller 16 can transmit usage information (i.e., information about the number of uses, length of uses, and other sensor information collected during use) to another device for storage and/or analysis. A battery 17 can be included to power one or more of the components of the device. Non-limiting examples of components that can be powered by the battery 17 (or charger, or AC/DC conversions) include the controller 16, pressure rods 62, powered cleaning device, and/or lights located on the back of the toothbrush head. A user may activate the powered cleaning device with a button 64 located on the body. FIG. 15 depicts an embodiment of the cartridge cover plate.

Figure 16:
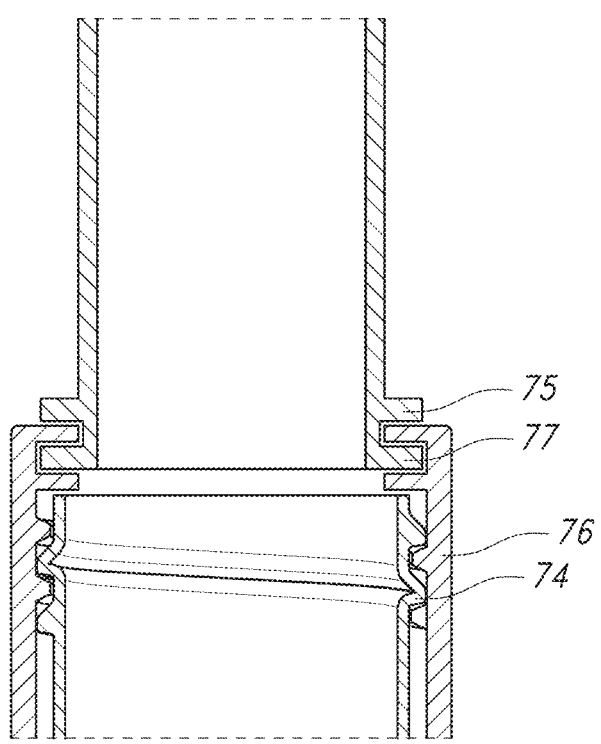
FIG. 16 shows an interconnect between modular dental device sections in accordance with an illustrative embodiment.

FIG. 16 depicts an embodiment of an interconnect configured to join one section of a modular dental device to another section of a modular dental device. A twist cap 76 on the bottom of one section twists onto the top of another section to form an interconnect. One section includes thread 74 and forms a threaded connection to the other section. A ridge 75 holds a cap in place, and a rubber seal 77 is inserted beneath the top of the cap to form a seal so that fluid can flow between sections.

Figure 17:
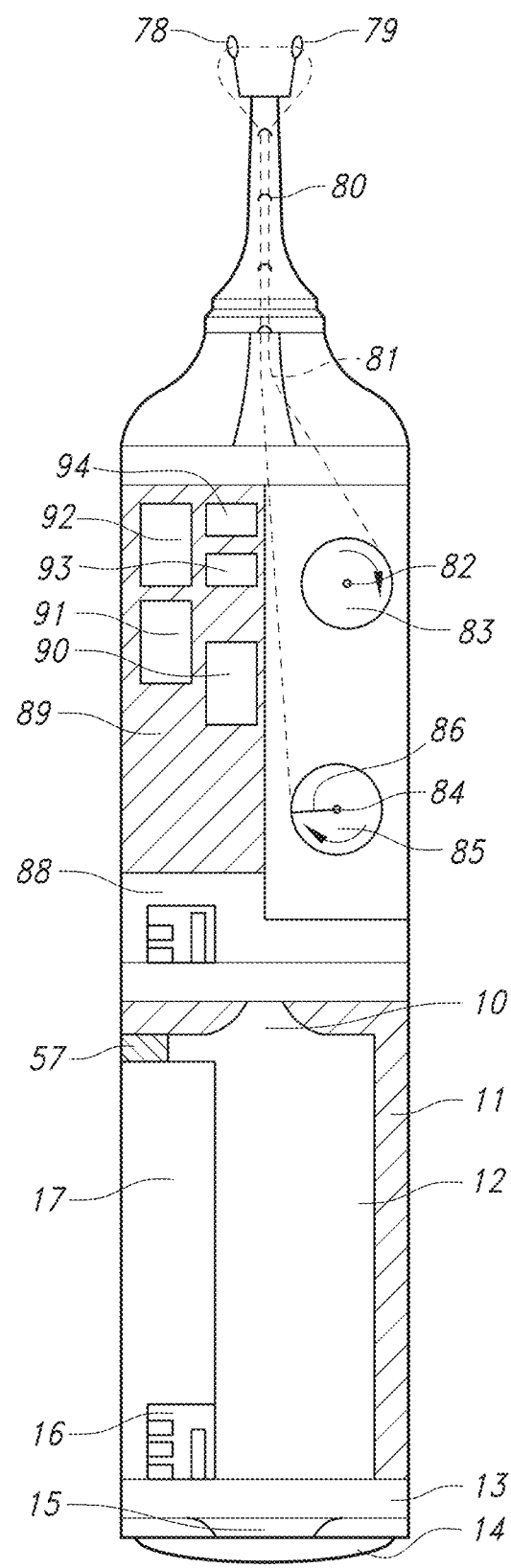
FIG. 17 shows a tooth floss section and head section in accordance with an illustrative embodiment.
Figure 18:
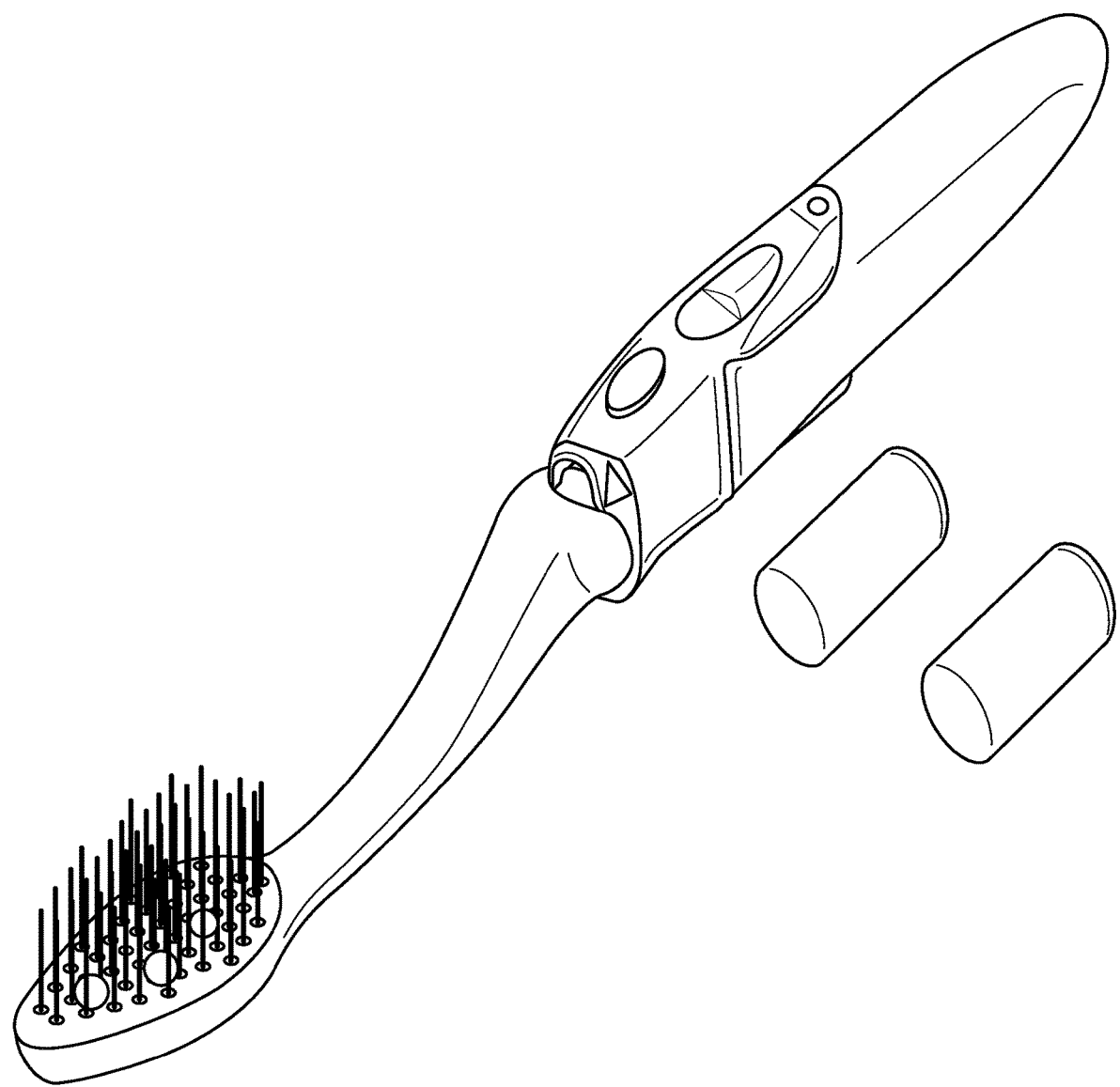
FIG. 18 shows an illustration of a non-configurable electric toothbrush with insertable cartridges, manual pump button, and cartridge cover in accordance with an illustrative embodiment.
Figure 19:
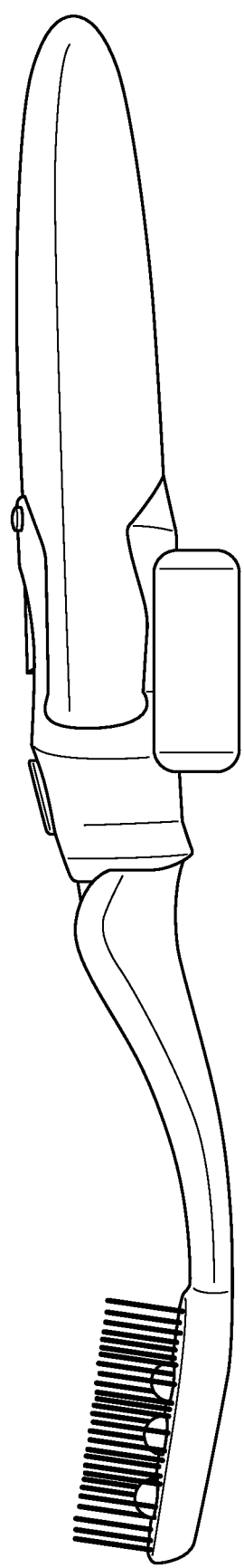
FIG. 19 shows an illustration of a side view of a non-configurable electric toothbrush with an insertable cartridge, manual pump button, and cartridge cover in accordance with an illustrative embodiment.
Figure 20:
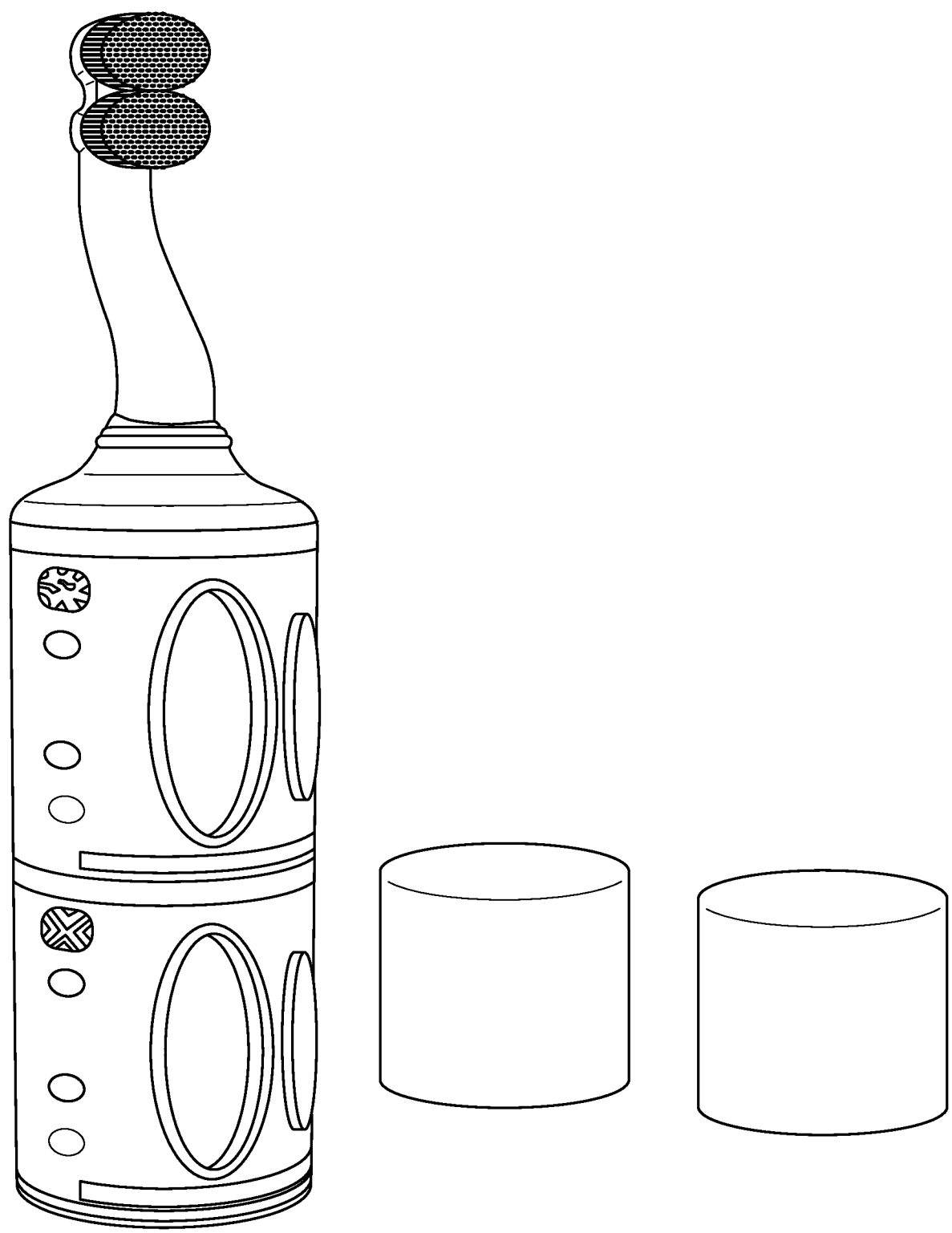
FIG. 20 shows an illustration of a modular dental device in accordance with an illustrative embodiment.

FIG. 17 depicts a modular dental device configured for flossing teeth. Floss 81 is directed through a guide 80. The guide 80 may be formed in different shapes, including ring shapes. A fork 79 includes at least one loop 78 to position the floss so that it can be inserted between teeth. Floss 81 is stored on a floss reel 85, which is connected to the housing or a section of the device by a pin 84. A slit 86 secures and/or locks the floss onto the reel 85. A second floss reel 83 is held onto the housing or modular dental device section by a second pin 82. A motor unit 89 contains a motor and power source, and drives floss reel 83 and/or floss reel 85 which advances the floss 81 through the guide 80, fork 79, and loop(s) 78. This action of the motor unwinds fresh floss from one reel, and winds used floss around the other reel. A controller 88 may be used to activate the motor unit, in response to user input or sensor input, and therefore control the movement of the floss.

Example Method

In another aspect, the present disclosure relates to methods of operating a modular dental device. A modular dental device is provided with multiple sections (e.g., two or three). Each section has at least one interconnect, and the sections are joined together so that an interconnect on the first section is connected to a first interconnect on the second section, and an interconnect on the third section is connected to a second interconnect on the second section. This arrangement forms a first modular dental device configuration.

The interconnects joining the sections together are detached, and interconnect on the first section is connected to a first interconnect on the third section, and an interconnect on the second section is connected to a second interconnect on the third section. This arrangement of connections forms a second modular dental device configuration. In some embodiments, the sections may be connected in different orders, or two sections may be attached in the same order, but with different interconnects. Different configurations may include different functionalities or be adapted to perform different procedures.

Modular Medical Device

In another aspect, the modular design described herein may be used in a medical device. Example medical device includes, but not limited to devices for administering medical treatments, vaccination, and cleaning. The modular medical devices can be configurable and use cartridges to dispense fluids, gels, and/or powders to improve general health, including oral hygiene. Multiple "core" units (i.e., modular device sections) can connect with attachable/releasable interconnects to create single device with multi-functionality utilizing various dispensing apparatuses.

Shown below in Table 2 are non-limiting examples of different modular medical device combinations. The column labeled "Head" refers to the head end of the modular medical device. The columns labeled "Section 1" and "Section 2" refer to modular medical device sections. Also included in Table 2 are non-limiting example uses of how the three modular medical device sections can be used. It should be understood that the below combinations are only examples, and that different sections from different rows of Table 2 can be combined to create other modular medical devices. For example, an embodiment of the present disclosure can include a powder dispensing head (for administering a treatment) but also contain self-cleaning chamber (e.g., to clean the powder container (e.g., cartridges, containers, chambers after use). The self-cleaning function can also be performed by flushing a chemical through the device to remove any residue of the compound that was previously dispensed (i.e., a "chemical flush").

TABLE 2

Medical Devices

| Usage | Section 1 | Section 2 | Section 3 |
|---|---|---|---|
| Administering a treatment (Medication or Vaccine) | Syringe Head | Fluid container (e.g., cartridges, containers, chambers), fluid dispensing system (e.g., pump) | Body (Hand Grip) |
| Administering a treatment (Medication or Vaccine) | Syringe Head | Fluid container (e.g., cartridges, containers, chambers), mixing chamber | Body (Hand Grip) |
| Administering a treatment (Medication or Vaccine) | Syringe Head | Fluid container (e.g., cartridges, containers, chambers), mixing chamber, and/or self-cleaning chamber | Body (Hand Grip) |
| Administering a treatment (Medication or Vaccine) | Spray Head | Fluid container (e.g., cartridges, containers, chambers), Fluid pump | Body (AC/DC converter, Battery, charger (e.g., Solar Panel), or self-cleaning system) |
| Administering a treatment (Medication or Vaccine) | Powder Dispensing Head | Powder container (e.g., cartridges, containers, chambers), power dispensing mechanism | Body (Battery, charger) |
| Administering a treatment (Medication or Vaccine) | Liquid Dispensing Head | Fluid container (e.g., cartridges, containers, chambers), Fluid pump | Body (Battery, charger) |
| Administering a treatment (Medication or Vaccine) | Liquid Dispensing Head, Powder Dispensing Head, Syringe Head, Spray Head, etc. | Fluid container (e.g., cartridges, containers, or chambers), Fluid pump, battery (hand grip) | N/A (extenders or cap) |
| Administering a treatment (Medication or Vaccine) | | Fluid container (e.g., cartridges, containers, or chambers), Fluid pump, battery (hand grip) | N/A (extenders or cap) |
| Cleaning | Abrasive Head | Controller, Hand Grip | Body (AC/DC converters, energy storage, chargers (e.g., Battery, Solar Panel)) |
| Cleaning | Cleaning Pad Head | Controller, Hand Grip | Body (AC/converter, energy storage, chargers (e.g., Battery, Solar Panel)) |
| Cleaning | Suction Head | Fluid container (e.g., cartridges, containers, chamber), Fluid pump | Body AC/converter, energy storage, chargers (e.g., Battery, Solar Panel) |
| Administering a treatment (wound or infection) | Torch Head | Gas container (e.g., cartridges, containers, chambers), Mixing Chamber, Gas Pump, and/or Self-Cleaning Chamber | Body AC/converter, energy storage, chargers (e.g., Battery, Solar Panel)) |

According to some embodiments of the present disclosure, the modular device shown in FIG. 1 can be configured as a modular medical device. With reference to FIG. 1, the head section, Section 1 and Section 2 shown in Table 2 above can correspond to the head 22, first section 25, second section 40, respectively. It should also be understood that the devices shown in Table 2 below can be connected with the attachable/releaseable interconnects 24, 30 shown in FIG. 1. As another non-limiting example, the same "Section 3" including a "Body (Battery, Solar Panel, or other charging or electricity conversion systems)" could be used in several different modular medical devices. For example, the same Body (Battery, Solar Panel or other charging systems or electricity conversion systems) could be used both as part of a cleaning tool with an abrasive head, and as part of a cleaning tool with a cleaning pad head. Therefore, a user with one or two "Body (Battery, Solar Panel or other charging or electricity conversion systems)" modular medical device sections can perform a wide range of functions by changing which "head" section and "Section 1" are connected using the attachable/releasable interconnects 24, 30.

According to some embodiments of the present disclosure, the modular medical device can include a teeth preservation system using inorganic dental hygiene methods. The modular medical device can a variety of configurable medical device sections, which can include sections that are: multi-colored, solar powered, battery powdered, flavored, replaceable units, remote controlled, edible, 100% biodegradable, and supported by hand-held wand (e.g., a body section). Embodiments of the present disclosure can also include a 100% biodegradable, flavored, salt nutrient stick that can be attachably/releasably connected to a head section. In some embodiments of the present disclosure, the head sections ("Head" section in the above Table 2) can be twist-on replaceable heads configured for repeated use.

Additionally, in some embodiments of the present disclosure, each of the sections in Table 2 can be configured to be microwavable. The sections can be cleaned by microwaving them. For example, the head section and section that includes a chamber/capsule/cartridge can be microwaved after use for cleaning.

Embodiments of the present disclosure can also include single use "packets" in addition to or in combination with cartridges/capsules. The single use packets can contain a compound that is dispensed by the device, either alone or in combination with another compound that is dispensed by the device.

Discussion

Modular devices and dental devices have applications in dentistry and healthcare because multi-purpose tools have advantages over single-purpose tools. These advantages include reduced cost, reduced size, and reduced weight when compared to the combination of single-purpose tools that multi-purpose tools can replace. For example, a set of single purpose tools may contain redundant components, such as motors. When the single purpose tools are combined into a multi-purpose tool, the redundant components can be eliminated. Additionally, multi-purpose tools may be more convenient to use and purchase.

Dental devices incorporating dispensing cartridges also present several advantages. Embodiments of the dental devices disclosed can dispense controlled amounts of compounds needed for different procedures. Many compounds used in dental cleaning must be administered in controlled doses. For example, whitening compounds include oxidizing agents such as hydrogen peroxide. These whitening compounds must be dispensed in controlled quantities and concentrations to minimize harmful side effects. Similarly, fluoride and other compounds used for dental treatment must be delivered in limited quantities to avoid negative effects. Even when it is not necessary to limit the quantity of a compound that is used, the described dental devices prevent the user from unnecessarily using excess dental compounds, thereby reducing treatment cost. Dental devices incorporating cartridges can also be used to deliver enhanced care. For example, the device may customize the treatment provided based on which cartridge is inserted.

While the present invention has been described with respect to specific embodiments, many modifications, variations, alterations, substitutions, and equivalents will be apparent to those skilled in the art. The present invention is not to be limited in scope by the specific embodiment described herein. Indeed, various modifications of the present invention, in addition to those described herein, will be apparent to those of skill in the art from the foregoing description and accompanying drawings. Accordingly, the invention is to be considered as limited only by the spirit and scope of the disclosure (and claims), including all modifications and equivalents.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Unless clearly specified to the contrary, there is no requirement for any particular described or illustrated activity or element, any particular sequence or such activities, any particular size, speed, material, dimension or frequency, or any particularly interrelationship of such elements. Accordingly, the descriptions and drawings are to be regarded as illustrative in nature, and not as restrictive.

It should be appreciated that various sizes, dimensions, contours, rigidity, shapes, flexibility and materials of any of the components or portions of components in the various embodiments discussed throughout may be varied and utilized as desired or required.

It should be appreciated that while some dimensions are provided on the aforementioned figures, the device may constitute various sizes, dimensions, contours, rigidity, shapes, flexibility and materials as it pertains to the components or portions of components of the device, and therefore may be varied and utilized as desired or required.

Although example embodiments of the present disclosure are explained in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

In summary, while the present invention has been described with respect to specific embodiments, many modifications, variations, alterations, substitutions, and equivalents will be apparent to those skilled in the art. The present invention is not to be limited in scope by the specific embodiment described herein. Indeed, various modifications of the present invention, in addition to those described herein, will be apparent to those of skill in the art from the foregoing description and accompanying drawings. Accordingly, the invention is to be considered as limited only by the spirit and scope of the disclosure, including all modifications and equivalents.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Unless clearly specified to the contrary, there is no requirement for any particular described or illustrated activity or element, any particular sequence or such activities, any particular size, speed, material, dimension or frequency, or any particularly interrelationship of such elements. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all sub ranges therein. Any information in any material (e.g., a United States/foreign patent, United States/foreign patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

What is claimed is:

1. A modular dental device, the device comprising:
an elongated housing having a length that is approximately that of an electric toothbrush, the elongated housing having a handle end and a head end, the elongated housing forming an open or closed chamber to receive a modular cartridge comprising a dispensable cleaning or whitening compound to be dispensed through and from the dental device, the elongated housing having a compartment to receive an energy storage module;
an attachable and releasable seal to connect to a port of the modular cartridge; and
a dispensing unit comprising a motor, controller, actuateable button, and tube all located in the elongated housing, the tube seal-ably connecting a pressure-inducing portion of the motor to the attachable seal to draw, when the motor is actuated by the controller, the dispensable cleaning or whitening compound from the modular cartridge to dispense at a dispensing port located at the head end; wherein the elongated housing comprises a first modular dental device section and a second modular dental device section;
wherein the dispensing unit is formed in the first modular dental device section of the elongated housing, and the open or closed chamber is formed in the second modular dental device section; and wherein the dispensing unit includes a funnel-shaped interconnect with a narrow funnel end positioned in the direction of fluid flow and an open funnel end opposite the narrow funnel end;
wherein the first modular dental device section is defined by a first end and a second end, wherein the first end comprises a head end, and the head end comprises a connector to attachably and releasably connect to a modular head portion, and wherein the second end of the first modular dental device section includes a first interconnect configured to releasably attach and detach from a corresponding interconnect;
wherein the second modular dental device section is defined by a third end and a fourth end, wherein the second modular dental device section includes, at the third end, the corresponding interconnect and a fluidic interface, wherein the fluidic interface is coupled to a fluidic interconnect that is connected to the chamber located in the second modular dental device section; and
wherein at the fourth end, the second modular dental device section includes a modular base section that is attachably and releasably connected to the fourth end of the second modular dental device section, wherein the modular base section includes a push button.

2. The modular dental device of claim 1, wherein the head end includes bristles that defines a brush region, the dispensing port being located proximal to the brush region.

3. The modular dental device of claim 1, wherein the head end includes a connector to attachably and releasably connect to a head portion, wherein the head portion comprises bristles that define a brush region.

4. The modular dental device of claim 1, wherein the head end includes a connector to attachably and releasably connect to a modular head portion, including a first modular head portion and a second modular head portion.

5. The modular dental device of claim 4, wherein the first modular head portion comprises bristles that defines a brush region.

6. The modular dental device of claim 4, wherein the second modular head portion comprises a fluid dispensing head.

7. The modular dental device of claim 1, wherein the dispensing unit further includes one or more thermal adjusting components, the one or more thermal adjusting components being configured to change a temperature of tube or tube-associated region when actuated.

8. A cartridge for a modular dental device, the cartridge comprising:
a dispensable cleaning or whitening compound; and
a housing that defines a chamber to store the dispensable cleaning or whitening compound, the housing defining a port in the chamber to which the dispensable cleaning or whitening compound can be drawn, wherein the cartridge is configured to operate with a modular dental device comprising:
an elongated housing having a length that is approximately that of an electric toothbrush, the elongated housing having a handle end and a head end, the elongated housing forming an open or closed chamber to receive a modular cartridge comprising a dispensable cleaning or whitening compound to be dispensed through and from the dental device, the elongated housing having a compartment to receive an energy storage module;
an attachable and releasable seal to connect to a port of the modular cartridge; and
a dispensing unit comprising a motor, controller, actuate-able button, and tube all located in the elongated housing, the tube seal-ably connecting a pressure-inducing portion of the motor to the attachable seal to draw, when the motor is actuated by the controller, the dispensable cleaning or whitening compound from the modular cartridge to dispense at a dispensing port located at the head end; wherein the elongated housing comprises a first modular dental device section and a second modular dental device section;
wherein the dispensing unit is formed in the first modular dental device section of the elongated housing, and the open or closed chamber is formed in the second modular dental device section; and wherein the dispensing unit includes a funnel-shaped interconnect with a narrow funnel end positioned in the direction of fluid flow and an open funnel end opposite the narrow funnel end;
wherein the first modular dental device section is defined by a first end and a second end, wherein the first end comprises a head end, and the head end comprises a connector to attachably and releasably connect to a modular head portion, and wherein the second end of the first modular dental device section includes a first interconnect configured to releasably attach and detach from a corresponding interconnect;
wherein the second modular dental device section is defined by a third end and a fourth end, wherein the second modular dental device section includes, at the third end, the corresponding interconnect and a fluidic interface, wherein the fluidic interface is coupled to a fluidic interconnect that is connected to the chamber located in the second modular dental device section; and
wherein at the fourth end, the second modular dental device section includes a modular base section that is attachably and releasably connected to the fourth end of the second modular dental device section, wherein the modular base section includes a push button.

9. A method of operating a modular dental device, the method comprising:
providing a plurality of modular dental device section, including a first modular dental device section, a second modular dental device section, and a third modular dental device section,
wherein the first dental device section is defined by a first end and a second end, wherein the first end includes at least one of a brush section and a dispensing section, and wherein the second end includes a first interconnect configured to releasably attach and detach from a corresponding interconnect;
wherein the second modular dental device section is defined by a third end and a fourth end, wherein the second modular dental device section includes, at the third end, the corresponding interconnect and a fluidic interface, wherein the fluidic interface is coupled to a fluidic interconnect that is connected to a chamber located in the second modular dental device section;
wherein the third modular dental device section is defined by a fifth end and a sixth end, wherein the third modular dental device section includes, at the fifth end, the corresponding interconnect and a mechanical link, wherein the mechanical link is coupled to a motor located in the third modular dental device section;
attaching, via the interconnect and the corresponding interconnect, the second end of the first device section to the first end of the second device section to form a first single unitary structure in a first configuration of the modular dental device;
detaching the second end of the first device section from the first end of the second device section;
attaching, via the interconnect and the corresponding interconnect, the second end of the first device section to the fifth end of the third device section to form a second single unitary structure, wherein the attachment between the first dental device section and the third dental device section form a second configuration of the modular dental device.

10. The method of claim 9, wherein the first single unitary structure of the first configuration of the modular dental device has a length that is approximately that of an electric toothbrush, and wherein the second single unitary structure of the second configuration of the modular dental device also has a length that is approximately that of an electric toothbrush.

11. The method of claim 9, wherein a fourth modular dental device section is provided, and wherein the fourth modular dental device section attaches and detaches to the second modular dental device section to provide a third configuration, wherein the fourth modular dental device section includes a motor and a battery.

12. The method of claim 11, wherein the fourth modular dental device section is configured to attach and detach from the third modular dental device section to provide a fourth configuration, wherein the fourth modular dental device section includes the battery.

13. The method of claim 9, wherein the first configuration of the modular dental device is about the length of an electric toothbrush.

14. The method of claim 9, wherein the fluidic interconnect is configured to heat the fluidic interface.

15. The method of claim 9, wherein the fluidic interconnect is configured to cool the fluidic interface with a heat exchanger.

16. The method of claim 15, wherein the heat exchanger is located at the chamber.

17. The method of claim 9, wherein the chamber is configured to receive a container or capsule of corresponding shape and size.

18. The method of claim 17, wherein the container or capsule is configured to hold a powder, a gel, or a fluid.

19. The method of claim 9, wherein the fluidic interconnect includes a pump.

20. The method of claim 19, wherein a powder, gel or fluid is extruded from the chamber via the pump.

21. The method of claim 9, wherein the brush section is modular and can be attached to a pick section.

22. A method of operating a modular medical device, the method comprising:
- providing a plurality of modular medical device section, including a first modular medical device section, a second modular medical device section, and a third modular medical device section,
- wherein the first medical device section is defined by a first end and a second end, wherein the first end includes at least one of a brush section and a dispensing section, and wherein the second end includes a first interconnect configured to releasably attach and detach from a corresponding interconnect;
- wherein the second modular medical device section is defined by a third end and a fourth end, wherein the second modular medical device section includes, at the third end, the corresponding interconnect and a fluidic interface, wherein the fluidic interface is coupled to a fluidic interconnect that is connected to a chamber located in the second modular medical device section;
- wherein the third modular medical device section is defined by a fifth end and a sixth end, wherein the third modular medical device section includes, at the fifth end, the corresponding interconnect and a mechanical link, wherein the mechanical link is coupled to a motor located in the third modular medical device section;
- attaching, via the interconnect and the corresponding interconnect, the second end of the first device section to the first end of the second device section to form a first single unitary structure in a first configuration of the modular medical device;
- detaching the second end of the first device section from the first end of the second device section;
- attaching, via the interconnect and the corresponding interconnect, the second end of the first medical device section to the fifth end of the third medical device section to form a second single unitary structure, wherein the attachment between the first medical device section and the third medical device section form a second configuration of the modular medical device.

23. The method of claim 22, wherein the first single unitary structure of the first configuration of the modular medical device has a length that is approximately that of an electric toothbrush, and wherein the second single unitary structure of the second configuration of the modular medical device also has a length that is approximately that of an electric toothbrush.

24. The method of claim 22, wherein a fourth modular medical device section is provided, and wherein the fourth modular medical device section attaches and detaches to the second modular medical device section to provide a third configuration, wherein the fourth modular dental device section includes a motor and a battery.

25. The method of claim 24, wherein the fourth modular medical device section is configured to attach and detach from the third modular medical device section to provide a fourth configuration, wherein the fourth modular dental device section includes the battery.

26. The method of claim 22, wherein the first configuration of the modular medical device is about the length of an electric toothbrush.

27. The method of claim 22, wherein the fluidic interconnect is configured to heat the fluidic interface.

28. The method of claim 22, wherein the fluidic interconnect is configured to cool the fluidic interface with a heat exchanger.

29. The method of claim 28, wherein the heat exchanger is located at the chamber.

30. The method of claim 22, wherein the chamber is configured to receive a container or capsule of corresponding shape and size.

31. The method of claim 30, wherein the container or capsule is configured to hold a powder, a gel, or a fluid.

32. The method of claim 22, wherein the fluidic interconnect includes a pump.

33. The method of claim 32, wherein a powder, gel or fluid is extruded from the chamber via the pump.

34. The method of claim 22, wherein the brush section is modular and can be attached to a pick section.

* * * * *